Patented Oct. 7, 1947

2,428,600

UNITED STATES PATENT OFFICE 2,428,600

METHOD OF STAINING GLASS WITH COPPER HALIDE VAPORS

Helen S. Williams, State College, Pa., assignor to Glass Science, Incorporated, New York, N. Y., a corporation of New York No Drawing. Application March 6, 1945, Serial No. 581,332

5 Claims. (Cl. 117—107)

This invention relates to improvements in glass manufacture and more particularly to the production of copper stains on glass or the introduction of copper into glass surfaces.

It is known that red glasses can be obtained by the use of copper in two fundamentally different ways. According to one method for producing a copper ruby, the copper compound is introduced as an ingredient of the glass batch; and under reducing conditions and in the presence of promoting oxides glasses are obtained which give a deep ruby color on annealing or reheating.

The other method called copper staining is based on a base exchange between solid or molten copper compounds and the alkali of the glass surface, this reaction being usually carried out by coating the surface of the glassware or a part of the surface with a mixture of a carrier substance and a copper compound, first firing in an oxidizing atmosphere to cause the copper to replace alkali in the glass and subsequently firing under reducing conditions to develop a red glass. This copper staining method is not well adapted for use with normal soda lime glass such as window glass or bottle glass and requires special glass compositions, particularly the presence of substantial amounts of potash.

According to the present invention, the vapors of volatile copper salts are caused to react with hot glass surfaces. By using the vapors of volatile copper compounds it has been found that these react much more intensively than would be expected from the action of the solid or molten copper compounds in the so-called copper staining process. It has also been found that special glass compositions are not required and that ordinary or normal soda lime glass can be readily and successfully stained or colored.

It has been found that the vapors of both cupric and cuprous halides react with the hot glass surfaces. Different volatile copper compounds can be used which in vapor form react with the glass at high temperatures with replacement of alkali by copper, the copper ions migrating into the glass and replacing the alkali ions which in turn migrate out of the glass. Cuprous chloride is particularly advantageous as a volatile copper compound in the process.

The process of the present invention is applicable for the treatment of both soda and potash glasses. It is one advantage of the process that it does not require special glass compositions and that it may readily be applied to normal or ordinary soda lime glasses such as window glass, bottle glass, etc.

According to the present invention, the glass surfaces heated to a high temperature are exposed to the vapors of cuprous chloride and advantageously with subsequent reduction treatment. The temperature and time of treatment can be varied, and products of varying properties and characteristics obtained. Thus, for example, the glass may be heated to 500° C. in a cuprous chloride atmosphere for varying lengths of time, e. g., from 15 minutes to 8 hours. The copper ions are thus introduced into the glass surface by the halide vapor treatment. The copper ions are thus introduced into the glass surface by a base exchange reaction with the sodium ions of the glass.

On subjecting the thus-treated glass to reduction, different results are obtained depending upon the extent to which copper has entered the glass surface and the conditions of reduction. If the amount of cuprous ions entering the glass surface is sufficiently great, subsequent reduction will result in the production of a mirror. For this purpose, the amount of cuprous ions entering the glass surface should be as great as possible and the depth of penetration is of secondary importance. In other words, the concentration gradient of the cuprous ions should be high.

By obtaining a low concentration gradient, the formation of a red copper stain is favored rather than the production of a mirror. For the production of a mirror, the reduction is advantageously carried out at a high temperature and for a short time, for example, at 700-800° C., by flash reduction with hydrogen of glass which has been exposed to cuprous chloride vapors for 6 hours at 550° C. At this high temperature the copper mirror forms within the surface of the glass and does not dissolve in nitric acid.

By introducing a regulated amount of copper into the glass surface and by reducing at lower temperatures, e. g., around 400 to 500° C., a copper ruby or metallic luster can be produced with a sufficiently high concentration of cuprous ions. If the amount of copper combined with the surface is not sufficiently high, the glass on reduction may not show a ruby color or metallic luster but will nevertheless contain copper.

It is one advantage of the present invention that it enables products of different properties to be obtained with accurate control of the resulting color. If the reaction is allowed to take place at a low temperature, around 350-425° C., all color shades can be obtained, between a faint pink and a deep red, depending upon the time of exposure to the cuprous chloride vapor. By using higher temperatures, around 500-550° C., a strong reaction takes place on the glass surface which leads to a high concentration of cuprous ions in the glass. Upon reduction, such a glass will not only develop a deep red color but it may also show a distinct metallic reflection. This metal luster can be used for decorative purposes and also as a basis for building up a layer of metallic copper by chemical deposition, such as from Fehling solution with formaldehyde or from alkaline copper phenylhydrazine solution. A heavy copper deposit in the form of a mirror can thus be obtained.

The invention is advantageously used for treating individual glass articles or objects for decorative purposes and for the formation of colored articles ranging in color from a faint pink to a deep red. Glass articles or surfaces can also be treated to adapt them for subsequent treatment to deposit copper or other metals thereon.

The invention will be further illustrated by the following specific examples but it will be understood that the invention is not limited thereto:

Example I

An article of normal or ordinary soda lime glass was placed in a closed container together with solid cuprous chloride and the container with its contents was heated for 6 hours at 425° C. with access to air. The cuprous chloride volatilizes, producing an atmosphere of cuprous chloride vapor which comes into contact with the hot glass surfaces and reacts therewith, the cuprous ions exchanging with the alkali ions of the glass forming, e. g., cuprous silicate or complex silicates and sodium chloride which is not volatile at this temperature and deposits as a "white bloom" on the glass surface. After such treatment the glass was cooled and washed and was colorless. On reduction in hydrogen at 460° C., it began to turn red in a few minutes and when removed from the furnace after 30 minutes had a medium red color and no metallic luster.

Example II

A similar glass article was exposed to cuprous chloride vapor at the same temperature (425° C.) for 24 hours and reduced under the same conditions (in hydrogen at 460° C.); and the resulting article had a more intense red color and a little metallic luster.

Example III

A normal soda lime glass was exposed to cuprous chloride vapor for 1 hour at 550° C., and then reduced in hydrogen at 460° C., for a few minutes. The glass was colorless before reduction and had a medium red color and no metallic reflection after reduction.

Example IV

A normal soda lime glass was exposed to cuprous chloride vapor for 6 hours at 550° C., and had a light blue color before reduction. After reduction in hydrogen at 460° C., it had a dark red color and a pronounced metallic reflection.

Example V

A normal soda lime glass was exposed to cuprous chloride vapor for 24 hours at 550° C., and had a deep blue color before reduction. After reduction, it had a very intense dark red color and a pronounced metallic reflection.

It is one of the advantages of the present invention, making use of volatile copper salts such as cuprous chloride, that it can be applied to normal soda lime glasses as well as to other special glasses such as those containing substantial amounts of potash. The process also has the advantage that it enables an accurate control of the resulting color to be obtained. Thus, if the reduction is allowed to take place at a low temperature, around 350-425° C., varying color shades can be obtained, as above pointed out, from a faint pink to a deep red, depending upon the time of exposure; while at higher temperatures, around 500-550° C., a strong reaction takes place on the glass surface which leads to a high concentration of copper ions in the glass and upon reduction such a glass will develop a deep red color and may also show a distinct metallic reflection.

It will thus be seen that the present invention provides an improved process for treating glass and glass articles to incorporate copper therein for decorative purposes and also for subsequent building up of metallic copper thereon. Where a copper mirror is formed by the process it differs from a layer of metallic copper on the glass which can be dissolved in nitric acid in that the copper mirror forms within the surface of the glass and is resistant to dissolving in nitric acid.

I claim:

1. The method of staining glass with copper which comprises subjecting a hot, alkali-containing glass surface to the action of vapors of a volatile copper halide which will react with the alkali of the glass surface with replacement of alkali ions of the glass with copper ions, and subsequently subjecting the glass containing copper within the glass surface to reduction with hydrogen at an elevated temperature.

2. The method of treating glass with copper which comprises subjecting hot, alkali-containing glass surfaces to the action of vapors of cuprous chloride with resulting replacement of alkali ions of the glass with copper ions, and subsequently subjecting the glass containing copper within the glass surface to reduction with hydrogen at an elevated temperature.

3. The method of producing glass colored by copper which comprises subjecting alkali containing glasses to the action of vapors of cuprous chloride at a temperature around 350-425° C., and subsequently reducing the resulting glass with hydrogen at an elevated temperature.

4. The method of producing glass colored by copper which comprises subjecting alkali containing glasses to the action of vapors of cuprous chloride at a temperature around 500-550° C., and subsequently reducing the resulting glass with hydrogen at an elevated temperature.

5. The method of treating alkali containing glasses which comprises subjecting the same at a temperature of about 350 to 550° C. to cuprous chloride vapors and continuing such treatment for a sufficient time to cause copper ions to replace alkali ions in the glass to an extent sufficient to give a colored glass product and subsequently subjecting the product to reduction with hydrogen at a high temperature.

HELEN S. WILLIAMS.

REFERENCES CITED

The following references are of record in the file of this patent:

UNITED STATES PATENTS

| Number | Name | Date |
| --- | --- | --- |
| 1,183,109 | Parsche | May 16, 1916 |
| 1,372,258 | Tomlinson | Mar. 22, 1921 |
| 1,497,417 | Weber | June 10, 1924 |
| 1,816,476 | Fink et al. | July 28, 1931 |